United States Patent
Tamir et al.

(10) Patent No.: US 12,050,670 B2
(45) Date of Patent: Jul. 30, 2024

(54) SYSTEMS, DEVICES, AND METHODS FOR WATERMARK EMBEDDING

(71) Applicant: Synamedia Limited, Staines Upon Thames (GB)

(72) Inventors: Assaf Yosef Tamir, Jerusalem (IL); Vered Anikster, Jerusalem (IL); Steven Jason Epstein, Hashmonaim (IL); Gwenaël Jacques Doërr, Rennes (FR)

(73) Assignee: Synamedia Limited, Maidenhead (GB)

(*) Notice: Subject to any disclaimer, the term of this patent is extended or adjusted under 35 U.S.C. 154(b) by 250 days.

(21) Appl. No.: 17/493,987

(22) Filed: Oct. 5, 2021

(65) Prior Publication Data

US 2023/0109439 A1 Apr. 6, 2023

(51) Int. Cl.
| | | |
|---|---|---|
| G06F 21/16 | (2013.01) | |
| H04L 9/08 | (2006.01) | |
| G06F 21/10 | (2013.01) | |
| H04L 67/10 | (2022.01) | |

(52) U.S. Cl.
CPC ............ *G06F 21/16* (2013.01); *H04L 9/0861* (2013.01); *G06F 21/107* (2023.08); *H04L 67/10* (2013.01)

(58) Field of Classification Search
CPC ..... G06F 21/16; G06F 21/107; H04L 9/0861; H04L 67/10
See application file for complete search history.

(56) References Cited

U.S. PATENT DOCUMENTS

| | | | | |
|---|---|---|---|---|
| 9,292,896 | B1 * | 3/2016 | Corley | ................ H04N 19/40 |
| 2003/0204727 | A1 * | 10/2003 | Sasaki | ............... H04N 1/32347 |
| | | | | 713/176 |
| 2008/0307108 | A1 * | 12/2008 | Yan | ..................... H04L 67/306 |
| | | | | 380/278 |

(Continued)

FOREIGN PATENT DOCUMENTS

| | | | | |
|---|---|---|---|---|
| EP | 1968231 A1 * | 9/2008 | ............ | G06F 21/10 |
| KR | 20210056657 A | 5/2021 | | |

(Continued)

OTHER PUBLICATIONS

PCT International Search Report and Written Opinion dated Dec. 21, 2022, PCT International Application No. PCT/GB2022/052342, pp. 1-12.

*Primary Examiner* — Darshan I Dhruv
(74) *Attorney, Agent, or Firm* — Fernando & Partners, LLP

(57) ABSTRACT

Techniques for embedding watermarks are described. In accordance with various embodiments, a server (e.g., a cloud in a core network) generates a profile for an encoded media content item and packages the profile as corresponding watermark metadata. The server then transmits the encoded media content item and the corresponding watermark metadata to at least one edge node in an edge cloud. A respective edge node in the edge cloud, upon receiving a request from a client device for the encoded media content item, where the request includes a client identifier associated with the client device, obtains a first portion of the encoded media content item and the corresponding watermark metadata. A watermark embedder of the edge node then embeds the client identifier in the embedded media content item according to the watermark metadata and transmits the watermark embedded media content item to the client device.

18 Claims, 7 Drawing Sheets

(56) References Cited

U.S. PATENT DOCUMENTS

| | | | |
|---|---|---|---|
| 2009/0080689 A1 | 3/2009 | Zhao et al. | |
| 2009/0292930 A1* | 11/2009 | Marano | G06F 21/6218 |
| | | | 726/28 |
| 2013/0148843 A1* | 6/2013 | Doerr | H04N 21/23892 |
| | | | 382/100 |
| 2015/0063567 A1 | 3/2015 | Robert et al. | |
| 2017/0118537 A1* | 4/2017 | Stransky-Heilkron | |
| | | | G06F 21/16 |
| 2022/0109713 A1* | 4/2022 | Huang | H04L 65/75 |
| 2022/0327234 A1* | 10/2022 | Gaddam | G06F 21/606 |
| 2023/0141582 A1* | 5/2023 | Gerrie | H04N 21/23476 |
| | | | 726/26 |

FOREIGN PATENT DOCUMENTS

| | | | | |
|---|---|---|---|---|
| WO | WO-0198903 A1 * | 12/2001 | | G06F 21/10 |
| WO | 2010003152 A1 | 1/2010 | | |
| WO | WO-2010003152 A1 * | 1/2010 | | G06T 1/0092 |

* cited by examiner

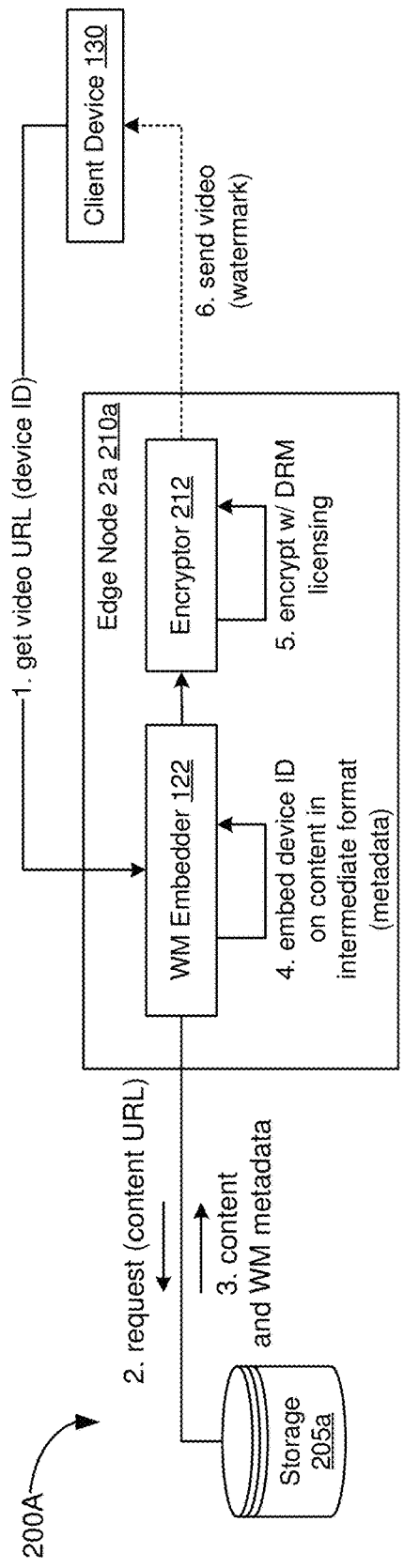
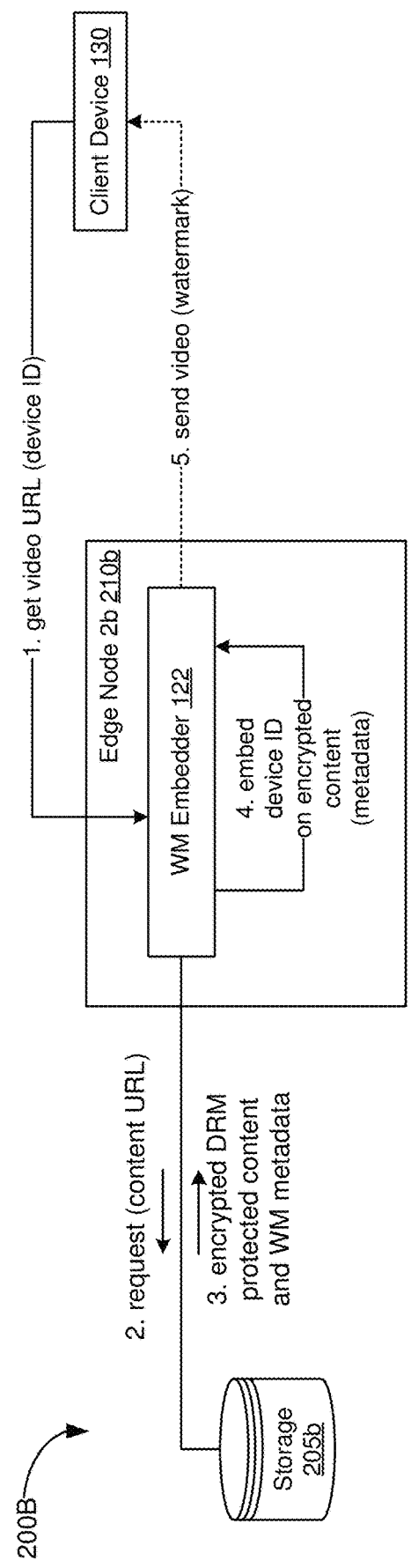

SYSTEMS, DEVICES, AND METHODS FOR WATERMARK EMBEDDING

TECHNICAL FIELD

The present disclosure relates generally to systems, devices, and methods for watermark embedding and, more specifically, to supporting edge watermark embedding.

BACKGROUND

Fifth-generation (5G) mobile communications networks support edge computing technology and provide services of enhanced quality. The edge computing environment (e.g., the edge cloud) is standardized for third-party orchestration, thus allowing more flexibility to deploy third-party packages on edge devices and request computational resources. Multi-access edge computing (MEC) is an emerging edge computing technology that enables cloud computing capabilities and a service environment at the edge of a computing network, especially when the computing network is a 5G network. MEC technology, which is typically implemented at base stations or other edge nodes, may allow cellular network operators to open their radio access network (RAN) to authorized third parties, such as application developers and content providers. With MEC technology, various computing tasks can be performed on edge nodes closer to the user for improved performance, e.g., using the RANs instead of computing on the core network. As such, 5G MEC is likely to become the primary means of distributing high resolution and high bandwidth content to both mobile and stationary devices that take advantage of other 5G network capabilities such as network slicing.

However, edge computing is expensive. During content distribution, certain processes such as encryption, decryption, encoding, decoding, and/or re-encoding, consume significant computational resources. As such, optimizing such processes in edge computing is critical from both a latency and cost perspective. For example, watermarking in media content typically involves encryption and/or decryption. Many previously existing watermark embedding systems and techniques do not take advantage of edge computing and/or 5G. In particular, not optimizing the allocation of watermark embedding tasks in the network may affect the quality of media content delivery, thus impacting user experience. In another example, some previously existing solutions attempt to embed watermarks outside the delivery network. Such solutions require more resources, are costly, and do not scale well. Moreover, such solutions may create issues such as maintaining duplicate storage, increasing latency, requiring a longer duration of video for the forensic watermark identifier to be embedded in the video, and opening security holes (e.g., collusion).

BRIEF DESCRIPTION OF THE DRAWINGS

So that the present disclosure can be understood by those of ordinary skill in the art, a more detailed description may be had by reference to aspects of some illustrative embodiments, some of which are shown in the accompanying drawings.

FIGS. 2A and 2B are diagrams illustrating watermark embedding techniques at the edge, in accordance with some embodiments;

Figure 1A:
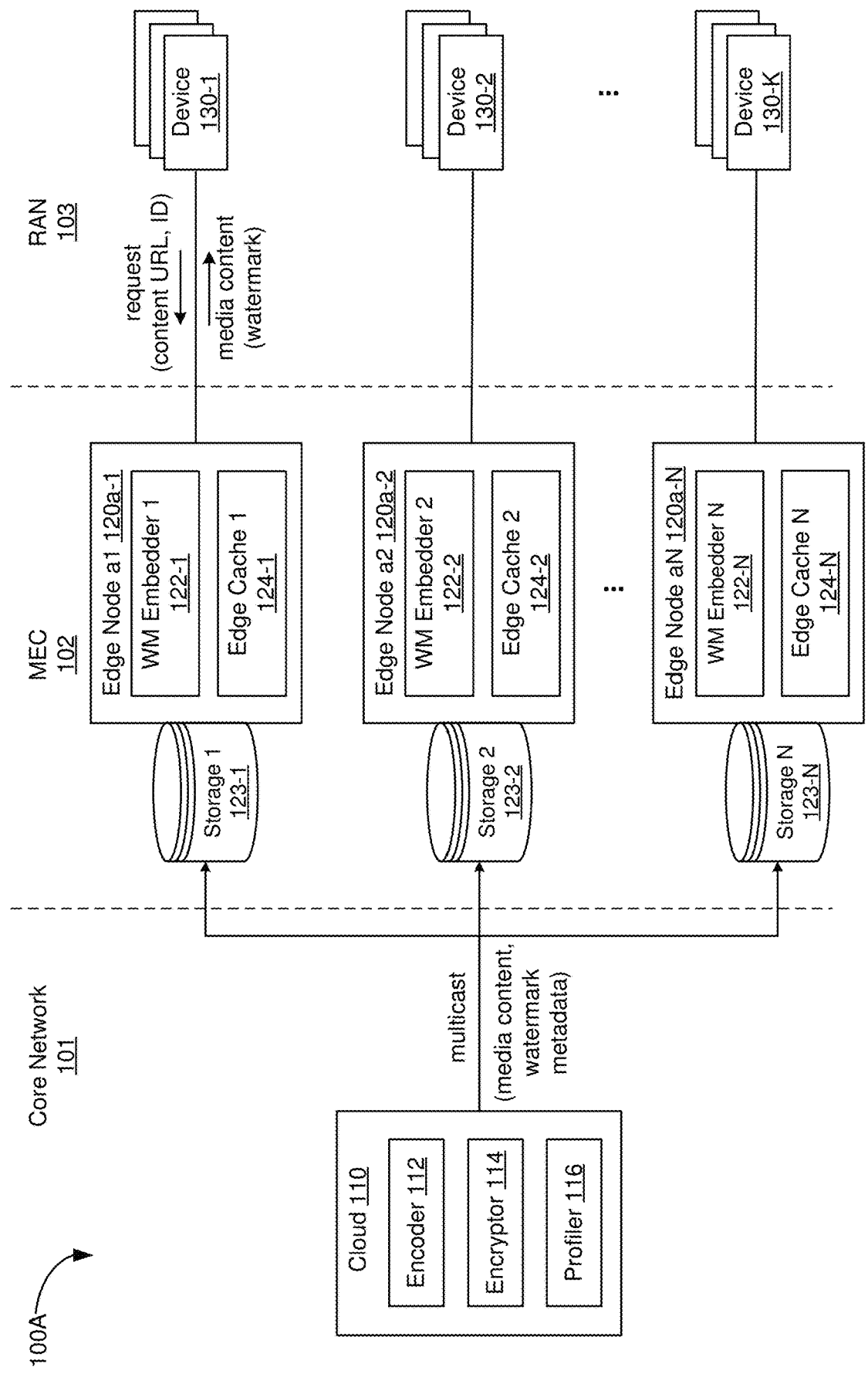
FIGS. 1A and 1B are block diagrams of exemplary watermark embedding systems, in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

DESCRIPTION OF EXAMPLE EMBODIMENTS

Numerous details are described in order to provide a thorough understanding of the example embodiments shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example embodiments described herein.

Overview

In accordance with some embodiments, watermark embedding techniques described herein split the watermark embedding process between the core network and the edge. Within the core network, a profiler analyzes the media content and discovers where and how to make changes to the media content to create a profile of said media content, e.g., identifying locations in the encoded content where changes can be introduced and which alternate values can be used at such locations. The profiler also generates watermark metadata to indicate how to utilize the profile to encode watermark information and sends the watermark metadata along with the media content to edge node(s), e.g., distributing popular content to interested edge nodes via multicast or unicast upon the edge pulling from a content distribution network (CDN) in the core network. At the edge (e.g., the edge cloud with MEC technology enablement), upon receiving request(s) for such media content, a respective edge node embeds watermarks according to the watermark metadata. Using the watermark embedding techniques described herein, even on encoded and encrypted media content, the edge node can embed watermarks without decrypting, decoding, re-encoding, and/or re-encrypting. As such, the solution described herein performs primary computations within the core network to minimize the computational cost on the edge. Accordingly, the watermark embedding techniques described herein optimize watermark embedding in 5G networks with cost savings, reduced latency, and reduced traffic within the core network.

In accordance with various embodiments, a method is performed at a server (e.g., a server in a cloud within a core network) with one or more processors and a non-transitory memory. The method includes generating a profile for an encoded media content item. The method further includes packaging the profile as corresponding watermark metadata for the encoded media content item. The method additionally includes transmitting the encoded media content item and the corresponding watermark metadata to at least one edge node.

In accordance with various embodiments, a method is performed at a first edge node in an edge cloud, e.g., at an edge device with one or more processors and a non-transitory memory. The method includes receiving a first request from a client device for a media content item, where the first request includes a client identifier associated with the client device. The method further includes obtaining a first portion of the media content item and watermark metadata corresponding to the media content item in response to the first request. The method also includes embedding the client identifier in the first portion of the media content item according to the watermark metadata to generate a first watermark embedded media content item. The method additionally includes transmitting the first watermark embedded media content item to the client device.

Example Embodiments

As described above, fifth-generation (5G) multi-access edge computing (MEC) is likely to become the primary means of distributing high resolution and high bandwidth content to both mobile and stationary devices. In many 5G networks, the edge cloud (also referred hereinafter to as the edge computing environment) facilitates content distribution. However, the means of content distribution by the edge are different from previously existing content distribution networks (CDNs). For example, the edge can perform the bitrate adjustments in adaptive bitrate (ABR) streaming, since the edge in 5G MEC is aware of congestion and device types in the edge cloud. Further, media content may be delivered using real-time transport (RTP) protocol over user datagram protocol (UDP) instead of hypertext transfer protocol (HTTP) for efficiency. Additionally, the scale in the edge may be in the order of tens of thousands as opposed to millions in previously existing CDNs. Relative to the massive number of cells in previously existing CDNs, each edge cloud in 5G networks provides smaller cell coverage. Also, popular content is likely to be transmitted to edge devices via multicast to optimize the core network usage and take advantage of the low latency radio access network (RAN) in edge clouds. In addition, in the edge computing environment, many third-party orchestrations are standardized. The standardization allows more flexibility to orchestrate and deploy third-party packages on the edge and more flexibility to request computing resources.

However, also as described above, edge computing is still expensive. As such, minimizing the computational cost on the edge and performing primary computations on the core network, where feasible, would improve security and scalability and at the same time, reduce cost and latency. The watermarking techniques disclosed herein leverage edge computing in 5G MEC for watermark embedding but avoid re-encoding and re-encrypting at the edge where possible. Computational resource-intensive tasks, such as profiling the media content to discover where and how to modify encoded media content to encode watermark information, are performed within the core network. As such, even on the encrypted and encoded content, the edge can apply watermarks according to the profiling results without decrypting, decoding, re-encoding, and/or re-encrypting at the edge. Because the content-aware profiling is performed at the core, the watermark embedding at the edge can be applied to any content format and used in conjunction with any delivery technique, e.g., RTP over UDP and/or ABR. In other words, the watermarking techniques described herein embed watermarks at the edge with light computing resources and create forensically marked streams at the latest controllable hop before delivering to individual clients. Accordingly, the watermark embedding techniques described herein reduce traffic and network latency and can be used in a hyperscale environment.

Reference is now made to FIG. 1A, which is a block diagram of an exemplary watermark embedding system 100A in accordance with some embodiments. In some embodiments, the exemplary system 100A includes a cloud 110 in a core network 101, a multi-access edge computing (MEC) environment 102, and a radio access network (RAN) 103. In some embodiments, the MEC environment 102 is an edge computing system (also referred to hereinafter as "the edge cloud"), which includes edge node a1 120a-1, edge node a2 120a-2, ..., edge node aN 120a-N, etc., collectively referred to hereinafter as the edge nodes a 120a. The edge nodes a 120a prepare data for delivering to the RAN 103, which includes client devices 130-1, client devices 130-2, ..., client devices 130-K, etc., collectively referred to hereinafter as the client devices 130. In some embodiments, devices (e.g., servers) in the cloud 110 are communicatively connected to the edge nodes a 120a in the MEC 102, and each of the edge nodes a 120a is further communicatively connected to a set of the client devices 130.

In some embodiments, the cloud 110 includes servers for communicating with the edge nodes a 120a in the MEC environment 102 (e.g., one or more network interfaces, not shown) and for encoding (e.g., by an encoder 112), encrypting (e.g., by an encryptor 114), and/or profiling (e.g., by a profiler 116) media content items. A media content item (also referred to as "multimedia content", "media content", "content" or "a content item") includes, but not limited to, video and/or audio. In some embodiments, the encoder 112 encodes media content items into any suitable encoding format, including, but not limited to, advance video encoding (AVC), versatile video coding (VVC), high efficiency video coding (HEVC), AOMedia video 1 (AV1), VP9, MPEG-2, MPEG-4, MP3, AC-3, etc. Further, in some embodiments, the encoder 112 includes a linear and/or a video-on-demand (VOD) encoder for encoding live and/or playback media content items. The encryptor 114 can apply any cryptographic operations on the live and/or playback media content items, including, but not limited to, applying block cipher according to Advanced Encryption Standard (AES) in Cipher Block Chaining (CBC) mode or counter (CTR) mode. In some embodiments, the keys used for cryptographic operations are digital rights management (DRM) licenses. In some other embodiments, content protection uses keys other than DRM licenses, including, e.g., clear-key protection such as clear key AES-128, clear key sample-AES, and/or clear key dynamic adaptive streaming over HTTP (DASH).

As described in further detail below, the cloud 110 profiles the media content items to generate content-aware watermark metadata. In some embodiments, the watermark metadata specify patterns and/or characteristics of watermarks, such as where the media content can be modified, which alternate values can be placed at these locations, which sequence of modifications would be applied to encode watermark information, etc. In some embodiments, the watermark metadata define preset sequences of changes to encode one bit of the watermark identifier, e.g., a client identifier associated with the client device 130. It should be noted that the terms "client identifier" and "watermark identifier" are used interchangeably hereinafter.

It should be noted that the profiler 116 can apply any profiling techniques in the art to generate the profile results. It should also be noted that the profiler 116 can generate watermark metadata, which can be applied with encrypted content, e.g., the media content items encrypted by the encryptor 114, or unencrypted content, e.g., the media content items in an intermediate format encoded by the encoder 112. For example, the profiler 116 can invoke the encryptor 114 to produce watermark metadata that can be applied with encrypted media content. As such, in some embodiments, the content and/or format of the watermark metadata are different for different content formats, e.g., different for unencrypted content, content encrypted with AES CTR, and/or content encrypted with AES CBC. Once the profiler 116 has created watermark metadata based on the profile, the cloud 110 sends the watermark metadata to the edge nodes a 120a along with the media content items in accordance with some embodiments.

For instance, the profile generated based on unencrypted media content includes a list of {offset, val_orig, val_alt} tuples, where the offset specifies the location within the content, and val_orig and val_alt are values that can be placed interchangeably at the offset without introducing visible artifacts while being detectable. The profiler 116 then packages the profile by allocating such changes or modifications specified in the profile to a watermark identifier bit to encode information. For example, to specify a rule of performing four changes per watermark identifier bit, the watermark metadata specify applying {{offset_1, val_orig}, {offset_2, val_alt}, {offset_3, val_alt}, {offset_4, val_orig}} to embed a watermark identifier bit that equals to 0 and applying {{offset_1, val_alt}, {offset_2, val_orig}, {offset_3, val_orig}, {offset_4, val_alt}} to embed a watermark identifier bit that equals to 1. As such, the profiler 116 groups several modification tuples and defines two antipodal sequences, such as {val_orig, val_alt, val_alt, val_orig} and {val_alt, val_orig, val_orig, val_alt}, that would be applied at locations {offset_1, offset_2, offset_3, offset_4} to encode a watermark bit equal to 0 and 1 respectively.

In some embodiments, the cloud 110 multicasts the media content items and the watermark metadata to a set of edge nodes a 120a in the MEC 102, e.g., where the media content items are popular, being requested and/or viewed a number of times above a threshold, and/or being requested and/or viewed at a frequency above a threshold. Upon receiving the media content items and the watermark metadata, a respective edge node a 120a adds the media content items to a localized catalog, e.g., edge node a1 120a-1 storing the media content items and the watermark metadata in storage device 1 123-1 coupled with edge node a1 120a-1, edge node a2 120a-2 storing the media content items and the watermark metadata in storage device 2 123-2 coupled with edge node a2 120a-2, . . . , edge node aN 120a-N storing the media content items and the watermark metadata in storage device N 123-N coupled with edge node aN 120a-N, etc.

In some embodiments, the edge nodes a 120a include watermark embedder 1 122-1, watermark embedder 2 122-2, . . . , watermark embedder N 122-N, etc., collectively referred to hereinafter as the watermark embedders 122. Further, in some embodiments, the edge nodes a 120a include edge cache 1 124-1, edge cache 2 124-2, . . . , edge cache N 124-N, etc., collectively referred to hereinafter as the edge cache 124. As shown in FIG. 1A, each edge node a 120a includes a respective watermark embedder 122 and a respective edge cache 124 in accordance with some embodiments.

As shown in FIG. 1A, in some embodiments, a respective client device 130 requests a media content item by sending to edge node a1 120a-1 a content URL (e.g., a URL referencing the requested content) and a client identifier such as a device identifier associated with the client device 130 and/or a user identifier associated with the client device 130. Upon receiving the request, watermark embedder 1 122-1, via edge cache 1 124-1, obtains the media content item and the watermark metadata from storage 1 123-1 in accordance with some embodiments. In some embodiments, watermark embedder 1 122-1 then embeds watermarks in the media content item using the client identifier, and edge node a1 120a-1 transmits the watermarked media content item to the client device 130.

Figure 1B:
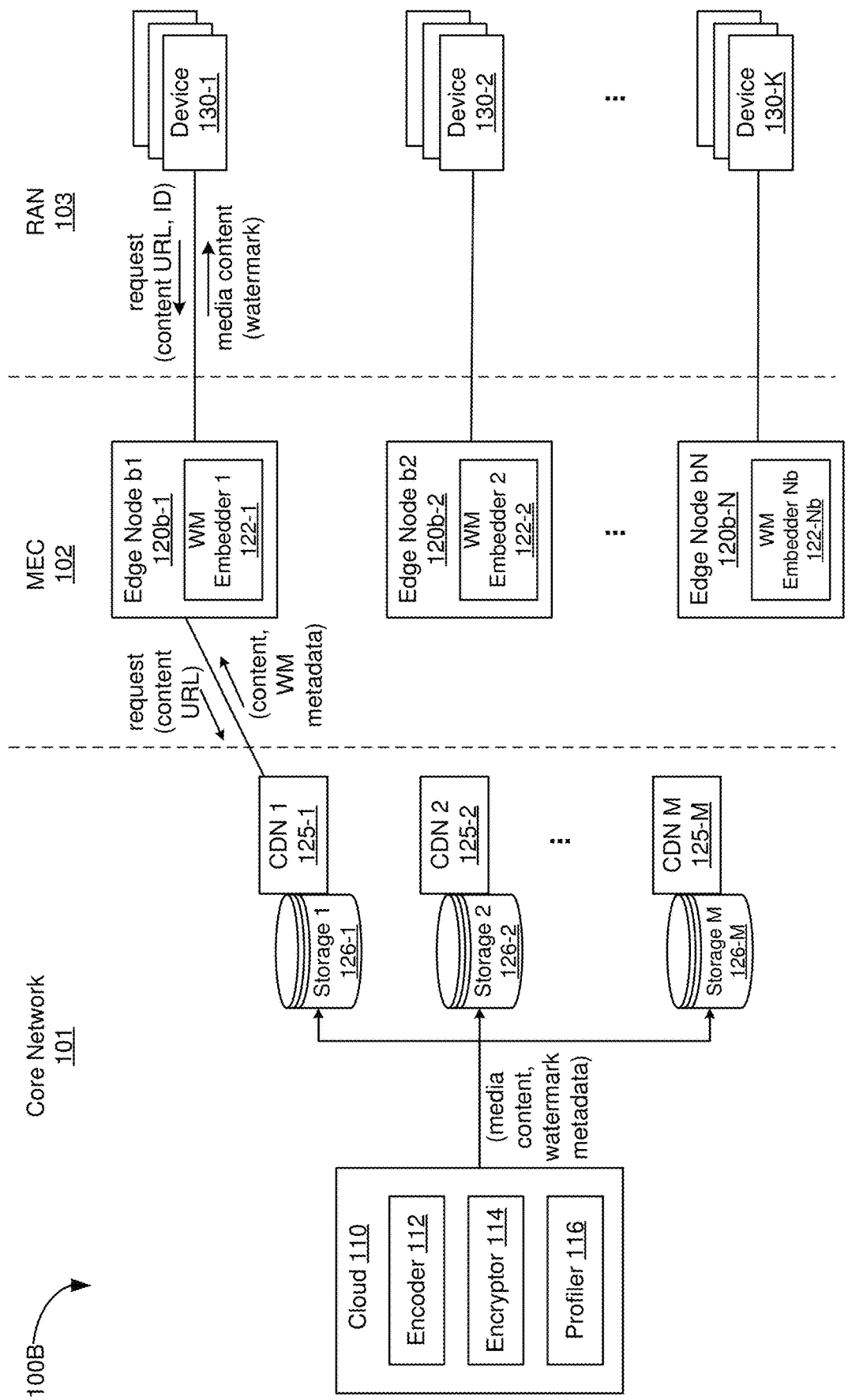

The watermark embedding techniques described herein are applicable in various configurations and according to various protocols. For example, in another exemplary watermark embedding system 100B as shown in FIG. 1B, the watermark embedders 122 are deployed on edge node b1 120b-1, edge node b2 120b-2, . . . , edge node bN 120b-N, etc., collectively referred to hereinafter as the edge nodes b 120b. In the exemplary system 100B, the core network 101 includes CDNs that are coupled to storage devices, e.g., CDN 1 125-1 coupled to storage device 1 126-1, CDN 2 125-2 coupled to storage device 2 126-2, . . . , CDN 1 125-M coupled to storage device 2 126-M, etc., collectively referred to hereinafter as the CDNs 125 and the storage devices 126 respectively. In some embodiments, once the profiler 116 generates the watermark metadata, the cloud 110 transmits the media content items and the watermark metadata to the CDNs 125 for caching in the storage devices 126. In some embodiments, each CDN 125 serves requests from a set of edge nodes b 120b.

In the exemplary system 100B, a respective client device 130 requests a media content item by sending to edge node b1 120b-1 a content URL, e.g., URL referencing the media content item, and a client identifier, e.g., an identifier associated with the respective client device 130. In some embodiments, edge node b1 120b-1 requests the media content item from CDN 1 125-1, e.g., by forwarding the content URL. CDN 1 125-1 obtains the media content item and the corresponding watermark metadata from storage device 1 126-1 and sends them to edge node b1 120b-1, e.g., via unicast. As such, edge node b1 120b-1 pulls the media content item and the corresponding watermark metadata from CDN 1 125-1 in the core network 101. The watermark embedder 122 can then perform watermark embedding according to the watermark metadata and edge node b1 120b-1 can then send the watermark embedded media content item to the respective client device 130.

As shown in FIGS. 1A and 1B, the watermark embedding techniques described herein take advantage of the low latency and high bandwidth of mobile networks for improved security and performance. Particularly, in 5G environment, the edge cloud caches and computes locally to a specific region, and the centralized storage and computing are in the cloud 110. Given the small cells of the 5G networks, each of the edge nodes a 120a (FIG. 1A) and edge nodes b 120b (FIG. 1B) (collectively referred to hereinafter as the edge nodes 120) in the edge cloud support tens of thousands of client devices instead of millions of users that previously existing CDNs would support. Accordingly, the edge cloud can provide full ability to orchestrate applications on the edge nodes 120, e.g., supporting the watermark embedding application by the watermark embedder 122.

Applying the watermark embedding techniques described herein in 5G networks, unique, personalized, and/or localized tasks, e.g., watermark embedding by the watermark embedding 122 in the MEC 102, are separated from heavy computations and centralized storage, e.g., encoding, profiling, and possibly encryption performed by the encoder 112, the profiler 116, and possibly the encryptor 114 in the cloud 110 within the core network 101. Common computational tasks, such as encoding, profiling, and possibly encryption, are performed once in the cloud 110 for the edge nodes 120. As such, the traffic in the core network is reduced, the cost and latency at the edge are lowered, and the security is enhanced because watermarks are embedded by the watermark embedder 122 in the MEC 102 without additional processing on the client devices 130. Further, the late watermark embedding on the edge saves storage and reduces traffic and complexity along the path of the data plane, because only a single copy of the content travels along the path until the unique watermark embedded version is created in the very last layer, e.g., at the edge node.

It should be noted that the exemplary systems 100A and 100B are by way of example. The encoder 112, the profiler 116, and possibly the encryptor 114 can be combined or separated, can be executed by one or more processors, and/or can be co-located on one server or distributed over multiple servers. Likewise, the edge node a 120a and the edge node b 120b can include different and/or additional components, and the watermark embedder 122 can be executed by one or more processors. Moreover, the watermark embedding techniques described herein are not limited to 5G. The watermark metadata can be generated on one or more servers in the cloud and transmitted to the edge using any medium, including, but not limited to, satellite, cable, internet protocol (IP), cellular, local network and/or wireless network, by any suitable method, for example, but not limited to broadcast, multicast, unicast, etc. Additionally, in various embodiments, one or more operations performed in the core network 110 can be re-arranged to perform in the MEC 102, or vice versa. For example, the watermark embedding techniques described herein are orthogonal to where and how the content is packaged, e.g., the content can be packaged in the cloud 110 or on the edge node 120.

It should also be noted that communications between the core network 101 and the MEC 102 can be encrypted or unencrypted. In some embodiments, an intermediary encryption can be used for such communications between the core network and the edge nodes to protect the content. In addition to providing content protection, using an intermediary encryption also saves network capacities, since a single encrypted version travels in the core network 101 (rather than an AES CTR version and an AES CBC version).

FIGS. 2A and 2B are diagrams 200A and 200B depicting various embodiments of watermark embedding techniques at the edge. As explained above with reference to FIGS. 1A and 1B, the watermark embedding techniques can be applied to media content items in encrypted or unencrypted forms. In FIG. 2A, an edge node 2a 210a in the MEC environment includes the watermark embedder 122 and an encryptor 212. When the client device 130 requests a media content item by sending a content URL referencing a media content item (e.g., a URL to a video), the watermark embedder 122 requests the media content item by forwarding the content URL and obtains from a storage device 205a (e.g., the storage device 123 in FIG. 1A or the storage device 126 in FIG. 1B) the media content item and the corresponding watermark metadata. In some embodiments, the media content item has been encoded and profiled by the cloud in the core network (e.g., encoded by the encoder 112 and profiled by the profiler 116, FIGS. 1A and 1B). As such, the media content item stored in the storage device 205a is in an intermediate format and the watermark metadata is based on the profile of the media content, which enables watermark embedding on the intermediate format of the media content at the edge.

Upon receiving the media content item and the corresponding watermark metadata, in some embodiments, the watermark embedder 122 performs just-in-time (JIT) packaging and watermark embedding of the media content item in the intermediate format according to the watermark metadata. In some embodiments, the encryptor 212 performs encryption at the edge with DRM licenses, e.g., using the DRM licenses provided by the cloud and/or generating one or more DRM licenses at the edge. Further, in some embodiments, the edge node 2a 210a caches the media content item, the corresponding watermark metadata, and/or the DRM licenses before sending the watermark embedded media content item and the DRM licenses to the client device 130 over the 5G RAN 103 (FIGS. 1A and 1B). Caching the corresponding watermark metadata allows subsequent JIT watermark embedding without querying the storage device 205a.

In FIG. 2B, an edge node 2b 210b in the MEC environment includes the watermark embedder 122. Similar to the process in the exemplary system 200A, in the exemplary system 200B, when the client device 130 requests a media content item by sending a content URL referencing a media content item (e.g., a URL referencing a video), the watermark embedder 122 requests the media content item by forwarding the content URL and obtains from a storage device 205b (e.g., the storage device 123 in FIG. 1A or storage device 126 in FIG. 1B) the media content item and the corresponding watermark metadata. Different from the process in the exemplary system 200A, in the exemplary system 200B, the media content item stored in the storage 205b has been encoded, profiled, encrypted (e.g., encrypted with DRM licenses), and/or packaged (e.g., push packaging) by the cloud in the core network (e.g., with the encoder 112, the profiler 116, and the encryptor 114, FIGS. 1A and 1B). As such, the media content item obtained by edge node 2b 210b is in a final format and the watermark metadata has been packaged using the profile of the media content and the parameters of the encryption, which enables watermark embedding on the final format of the media content at the edge.

Upon receiving the encrypted media content item and the corresponding watermark metadata, in some embodiments, the watermark embedder 122 of edge node 2b 210b performs JIT watermark embedding of the media content item according to the watermark metadata, e.g., by embedding bits of the client identifier (e.g., the identifier associated with the client device 130) within the encrypted media content item according to the settings specified in the watermark metadata. Accordingly, the encrypted media content item is protected with watermarks that are both imperceptible and detectable. In some embodiments, the edge node 2b 210b also obtains DRM license(s) upon receiving the media content item and the watermark metadata, e.g., from the core network or from the storage device 205b. In some embodiments, the edge node 2b 210b caches the media content item, the corresponding watermark metadata, and/or the DRM license(s) before sending the watermark embedded media content item and the DRM license(s) to the client device 130 over the 5G RAN (e.g., the RAN 103 in FIGS. 1A and 1B).

The watermark embedding configuration as shown in FIG. 2B is advantageous. The core network can profile the media content item in any format, generate the watermark metadata for any units of the media content item, and send the media content item and the watermark metadata using any transmission methods. Regardless of the delivery format and method, the media content item located at the storage device 205*b* is in its final format for watermark embedding at edge node 2*b* 210*b*. As such, the watermark embedding method as shown in FIG. 2B maximizes common computations in the cloud and minimizes latency and cost at the edge. For example, the media content item can be ABR content, video-on-demand (VOD) files, and/or linear content in live streams. In another example, the profiler can generate watermark metadata on a frame-by-frame, segment-by-segment, a file-by-file (e.g., VOD files), block-by-block, picture-by-picture, group of pictures (GOP)-by-GOP, chunk-by-chunk, access unit (AU)-by-AU, and/or time unit-by-time unit basis. As such, the watermark metadata can specify embedding watermarks across frames, segments, files, blocks, pictures, GOPs, AUs, and/or time units, e.g., spreading bits of the watermark identifier over multiple frames, segments, files, blocks, pictures, GOPs, AUs, and/or time units. In yet another example, the media content item and the corresponding watermark metadata can be transmitted to the edge via multicast to relevant edge nodes, e.g., push packaging, or via unicast, e.g., pulling by an edge node, using protocols such as RTP over UDP (e.g., Web Real-Time Communication (WebRTC)). Additionally, the media content item can be packaged in any format for delivery, e.g., Dynamic Adaptive Streaming (DASH) or HTTP Live Streaming (HLS).

In some embodiments, based on the cost of edge computing in the MEC environment (e.g., the processing time, the memory usage, the network condition, congestion, etc.) and/or the capacities of the edge node (e.g., device types), the encryption can be performed in the MEC environment by the edge node or in the core network by the cloud. For example, the cloud in the core network (e.g., at the profiler 116, FIGS. 1A and 1B) can determine the cost of edge computing and/or the capacities of a respective edge node based on the information included in the request from the respective edge node. In another example, since the edge in 5G MEC is aware of congestion and device types in the edge cloud, a respective edge node can request the cloud to encrypt the encoded content and profile the encrypted encoded content so that the computation at the edge would be light. In some embodiments, having determined that the encryption would be performed in the MEC environment by the edge node, the edge node performs watermark embedding on an intermediate form and performs encryption at the edge as shown in FIG. 2A. On the other hand, having determined that it is more efficient to perform the encryption in the core network by the cloud, the edge node embeds watermarks on the final format of the media content items without the edge node performing encryption and/or re-encryption as shown in FIG. 2B.

Figure 3:
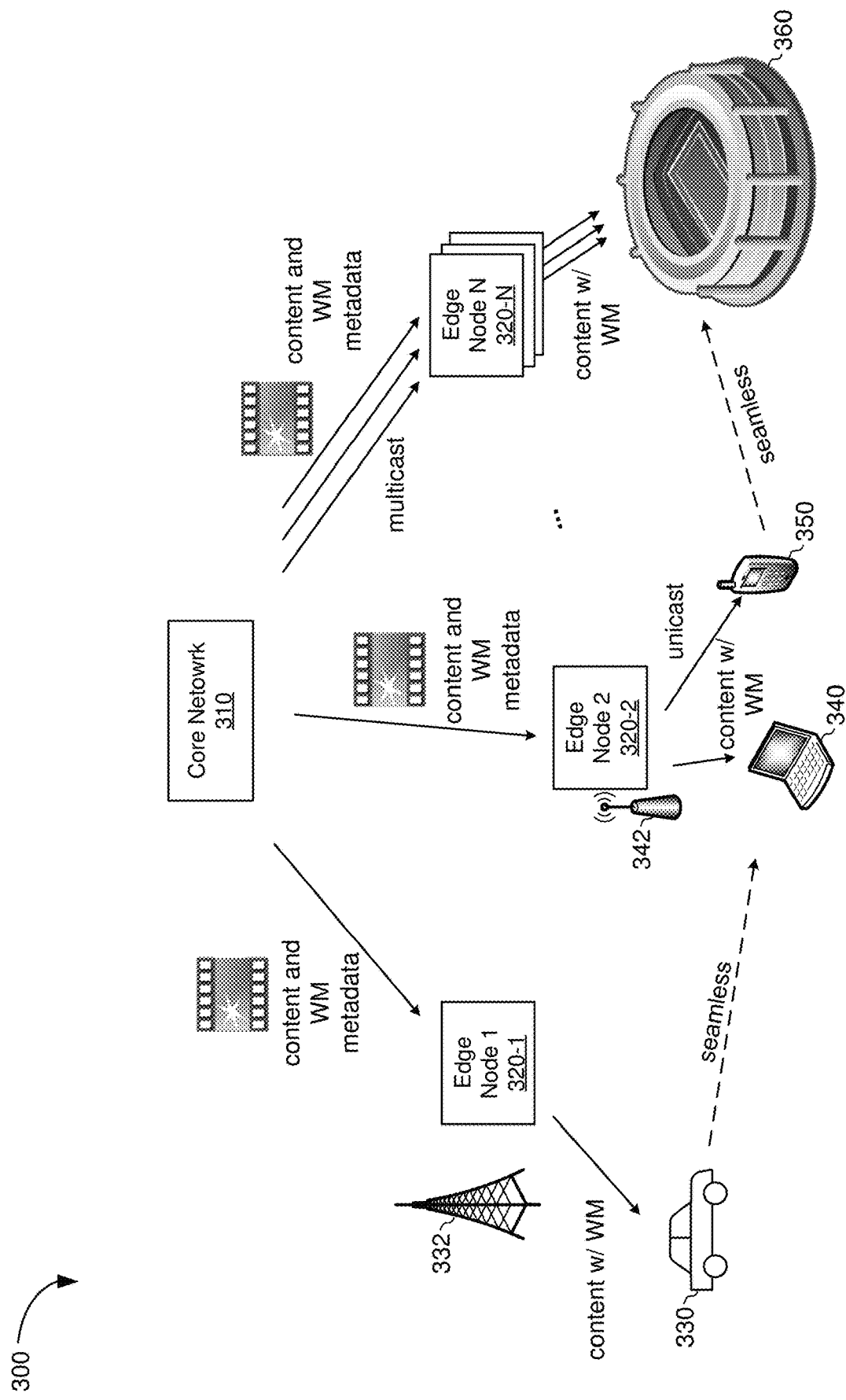
FIG. 3 is a diagram illustrating applying the watermark embedding techniques for enhanced security in an exemplary network, in accordance with some embodiments.

FIG. 3 illustrates applying the watermark embedding techniques described herein for enhanced security in an exemplary network 300 in accordance with some embodiments. In some embodiments, the exemplary network 300 includes a core network 310 (e.g., the core network 101, FIGS. 1A and 1B) communicatively coupled to edge node 1 320-1, edge node 2, 320-2, . . . , edge node N 320-N, etc. (collectively referred to hereinafter the edge nodes 320). As described above with reference to FIGS. 1A and 1B, in some embodiments, the cloud in the core network 310 encodes, profiles, and possibly encrypts media content items and distributes media content items and the corresponding watermark metadata to the edge nodes 320. Further as described above with reference to FIGS. 2A and 2B, in some embodiments, each edge node 320 embeds watermarks in the media content items according to the watermark metadata and provides watermarked media content items to client devices, such as a vehicle 330, a computing device 340, a mobile device 350, and/or devices in a stadium 360. Because once media content items are encoded, profiled, and possibly encrypted in the cloud and the edge nodes 320 embed watermarks according to the same watermark metadata, the media content item is consistently protected with watermarks, e.g., without any skipping, disruption, or gap, when a client device connects to the different edge nodes 320 and/or the media content item is being streamed via different methods and/or protocols.

For example, in FIG. 3, the vehicle 330 is initially connected to edge node 1 320-1 via a base station 332. The vehicle 330 requests a media content item and sends along a client identifier associated with the vehicle 330. Following the watermark embedding process described above with reference to FIGS. 1A-1B and 2A-2B, the JIT watermark embedder on edge node 1 320-1 embeds watermarks in the media content item according to the watermark metadata, where the watermarks include the client identifier associated with the vehicle 330. As a result, watermarks are embedded in a first portion of the media content item being streamed to the vehicle 330 in a way that is both imperceptible and detectable, where the first portion can include any number of block(s), frame(s), picture(s), segment(s), GOP(s), chunk(s), file(s), AU(s), and/or time unit(s).

Further as shown in FIG. 3, the vehicle 330 may travel and move away from the base station 332. As the vehicle 330 moves closer to an access point 342, e.g., the access point 342 providing connections to the computing device 340, the vehicle 330 seamlessly switches its connection from edge node 1 320-1 to edge node 2 320-2, and a second portion of the media content item is streamed to the vehicle 330, where the second portion is adjacent to the first portion, e.g., starting at the next block, frame, picture, segment, GOP, chunk, file, AU, and/or time unit, etc. Similar to the first portion, the second portion can include any number of block(s), frame(s), picture(s), segment(s), GOP(s), chunk(s), file(s), AU(s), and/or time unit(s). Because the JIT watermark embedder on edge node 2 320-2 embeds the client identifier associated with the vehicle 330 with watermarks in the media content item according to the same watermark metadata, watermarks are embedded in the second portion of the media content item being streamed to the vehicle 330 in the same way as in the first portion of the media content item. In other words, despite the connection change, the system 300 provides continuous and undisrupted protection of the media content item by JIT embedding watermarks in the media content item according to the same watermark metadata generated in the core network 310.

In another example, in FIG. 3, the mobile device 350 is initially connected to edge node 2 320-2, e.g., via the access point 342. The mobile device 350 requests a media content item and sends along a client identifier associated with the mobile device 350. In response, edge node 2 320-2 pulls the media content item from the core network 310, e.g., via unicast. Following the watermark embedding process described above with reference to FIGS. 1A-1B and 2A-2B, the JIT watermark embedder on edge node 2 320-2 embeds watermarks in the media content item according to the watermark metadata, where the watermarks include the client identifier associated with the mobile device 350. As a result, watermarks are embedded in a first portion of the media content item being delivered to the mobile device 350 in a way that is both imperceptible and detectable.

Also as shown in FIG. 3, the location of the mobile device 350 may change, e.g., moving away from the access point 342 and moving into the stadium 360. The edge node N 320-N and its neighboring edge nodes near the stadium 360 obtain the watermark metadata and the media content from the core network 310 via multicast for improved efficiency. When the connection to the mobile device 350 is seamlessly switched from edge node 2 320-2 to edge node N 320-N, a second portion of the media content item is streamed to the mobile device 350. Because the JIT watermark embedder on edge node N 320-N embeds the identifier associated with the mobile device 350 as watermarks in the media content item according to the same watermark metadata, watermarks are embedded in the second portion of the media content item being streamed to the mobile device 350 in the same way as in the first portion of the media content item transmitted via unicast. In other words, despite the differences in the content delivery method, the system 300 provides continuous protection of the media content item by JIT embedding watermarks in the media content item according to the same watermark metadata generated by the cloud in the core network 310.

In some embodiments, networks enable a multicast operation on demand (MooD) feature that allows the network to determine how many client devices in any given area are consuming the same content and intelligently switches between multicast and unicast to ensure the network efficiency in that area. For instance, when the MooD feature is enabled in the exemplary system 300 and the number of client devices connecting to edge node N 320-N is less than a threshold at the beginning of a game, the core network 310 unicasts the watermark metadata and the media content item to edge node N 320-N. Once the number of client devices in the stadium 360 exceeds the threshold, e.g., more people with devices streaming within the stadium 360, the core network 310 multicasts the watermark metadata and the media content item to edge node N 320-N and its neighboring edge nodes. Despite the changes to the delivery method, edge node N 320-N continuously applies JIT watermark embedding and packaging according to the same watermark metadata to protect the media content.

As shown in FIG. 3, watermark embedding is autonomous at the edge. Once the corresponding watermark metadata is sent with the media content item to the edge, e.g., via multicast as shown in FIG. 1A or via unicast as shown in FIG. 1B, one or more edge nodes 320 can embed the watermarks without requesting further instructions from the core network 310. Moreover, the progress and/or state of embedding watermarks in a media content item are also determined by a respective edge node 320 or coordinated by multiple edge nodes 320 without further instructions from the core network regardless of the delivery method chosen by the edge node(s) 320, e.g., via unicast from edge node 2 320-2 or via multicast from edge node N 320. As such, the traffic in the core network is reduced and watermark embedding efficiency is improved.

Figure 4A:
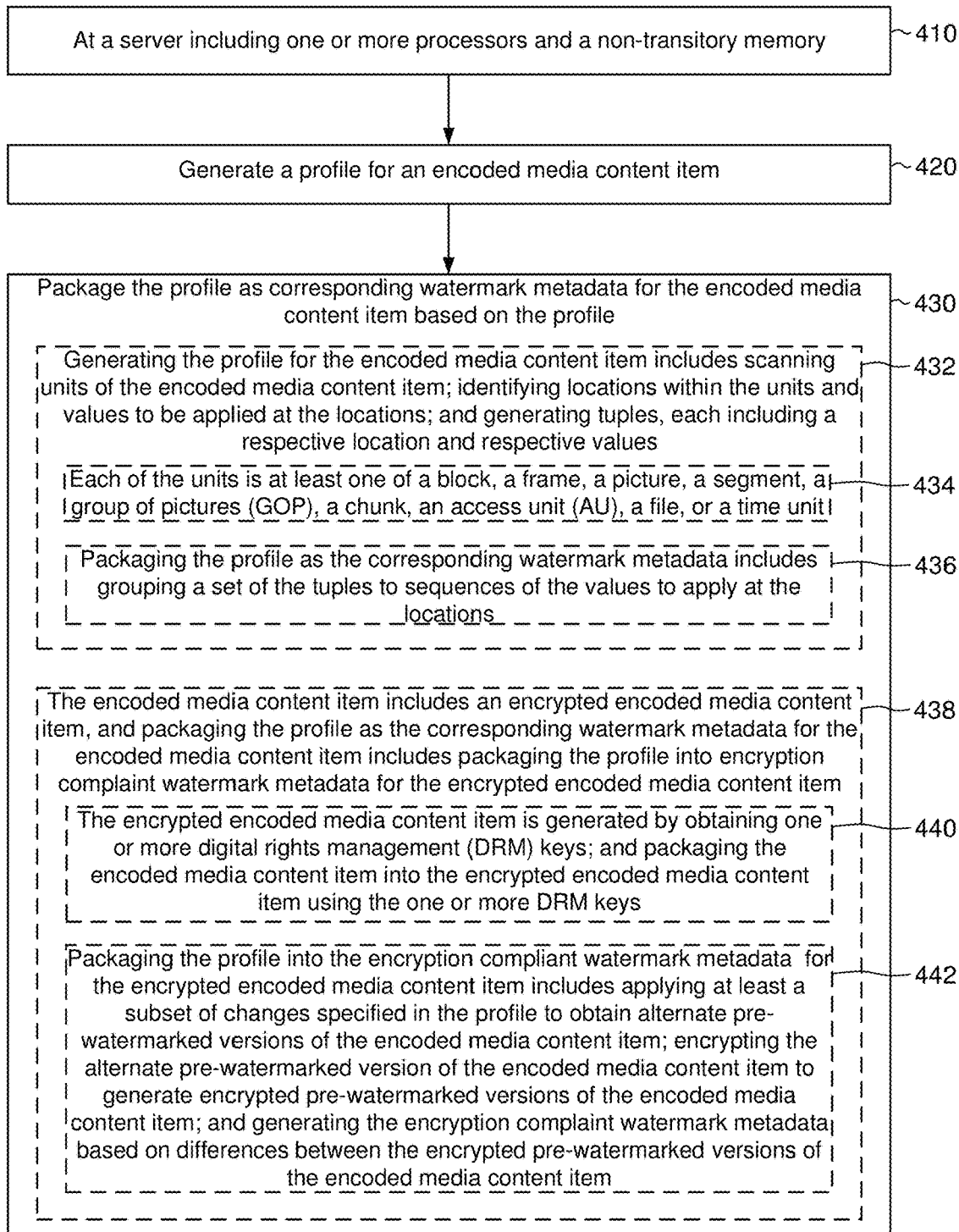
FIGS. 4A and 4B are flowcharts illustrating a method for generating watermark metadata, in accordance with some embodiments.
Figure 4B:
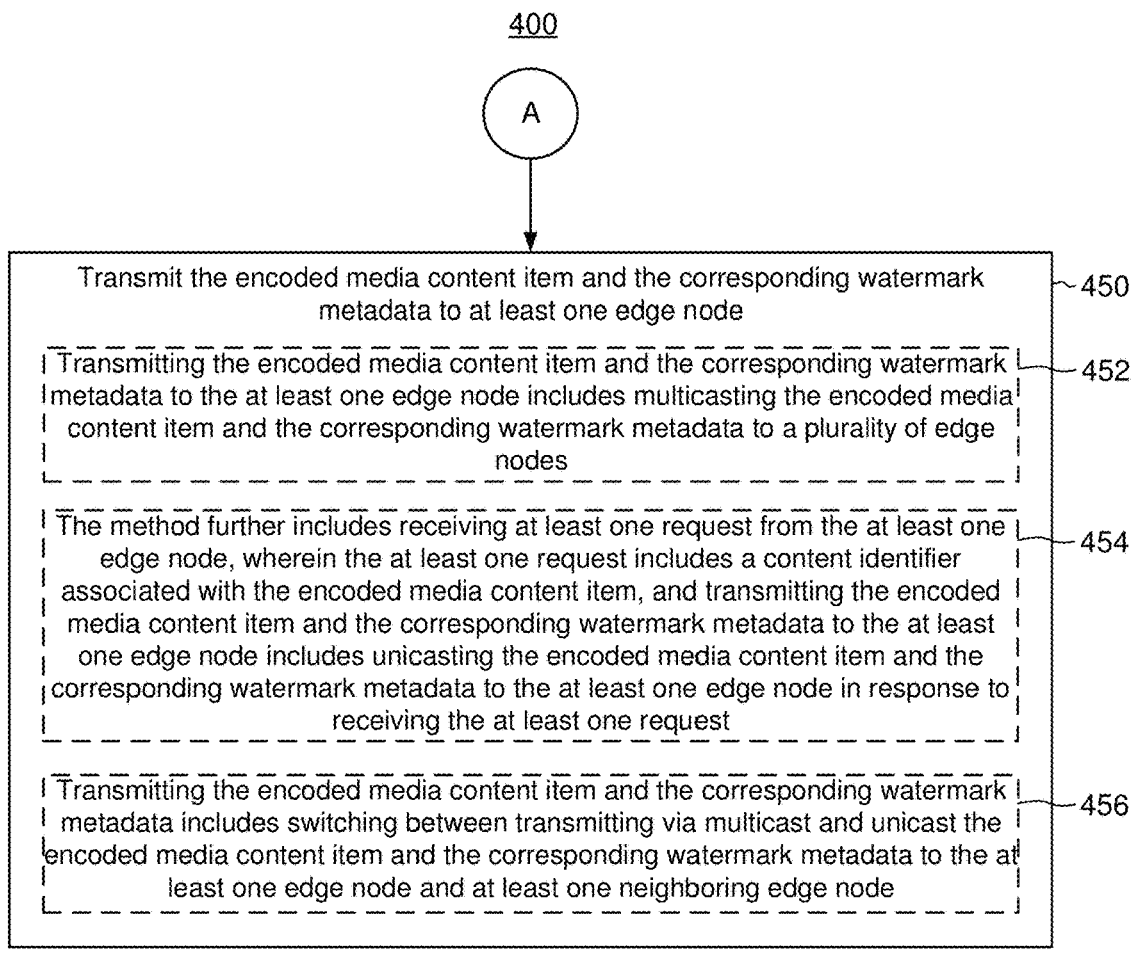

FIGS. 4A and 4B are flowcharts illustrating a method 400 for generating watermark metadata in accordance with some embodiments. In some embodiments, as represented by block 410, the method 400 is performed at a server with one or more processors and a non-transitory memory, e.g., a server in a cloud (e.g., the cloud 110 in FIGS. 1A and 1B) within a core network (e.g., the core network 101 in FIGS. 1A-1B and 3).

As represented by block 420, the method 400 begins with the server (e.g., by the profiler 116 in FIGS. 1A and 1B) generating a profile for an encoded media content item, e.g., for a media content item that has been encoded by the encoder 112 in FIGS. 1A and 1B. The method 400 continues, as represented by block 430, with the server packaging the profile as corresponding watermark metadata for the encoded media content item, e.g., creating the watermark metadata during or as a result of the profiling.

In some embodiments, as represented by block 432, generating the profile for the encoded media content item includes scanning units of the encoded media content item, identifying locations within the units and values to be applied at the locations, and generating tuples, each including a respective location and respective values. For example, the profiler 116 (FIGS. 1A and 1B), upon scanning the encoded media content item, determines where and how to place the watermark identifier bits and to introduce modifications across the units in a way that is both imperceptible and detectable. In such embodiments, as represented by block 434, each of the units is at least one of a block, a frame, a picture, a segment, a group of pictures (GOP), a chunk, an access unit (AU), a file, or a time unit in accordance with some embodiments. Also in such embodiments, as further represented by block 436, packaging the profile as the corresponding watermark metadata includes grouping a set of the tuples to sequences of the values to apply at the locations.

In some embodiments, as represented by block 438, the encoded media content item includes an encrypted encoded media content item (e.g., encrypted using AES CTR or AES CBR), and packaging the profile as the corresponding watermark metadata for the encoded media content item includes packaging the profile into encryption compliant watermark metadata for the encrypted encoded media content item. In such embodiments, as represented by block 440, the encrypted encoded media content item is generated by obtaining one or more digital rights management (DRM) keys, and packaging (e.g., push packaging with DRM settings) the encoded media content item into the encrypted encoded media content item using the one or more DRM keys, e.g., using the one or more DRM keys for encrypting the encoded media content item.

In some embodiments, as represented by block 442, packaging the profile into the encryption compliant watermark metadata for the encrypted encoded media content item includes applying at least a subset of changes specified in the profile to obtain alternate pre-watermarked versions of the encoded media content item, encrypting (e.g., using AES CTR or AES CBC) the alternate pre-watermarked versions of the encoded media content item to generate encrypted pre-watermarked versions of the encoded media content item, and generating the encryption compliant watermark metadata based on differences between the encrypted pre-watermarked versions of the encoded media content item. In other words, the server (e.g., by the encryptor 114 in FIGS. 1A and 1B) encrypts the encoded media content item and/or protects the media content item using DRM key(s), and the profiling (e.g., by the profiler 116 in FIGS. 1A and 1B) discovers where to place the bits of the watermark and determines how to place the bits of the watermark on encoded and encrypted content.

For example, the profile of the media content item includes a list of {offset, val_orig, val_alt} modification tuples specifying that the values val_orig and val_alt can be placed interchangeably at location offset in the media content without introducing visible artifacts while being detectable. The profiler groups several modification tuples and defines multiple antipodal sequences, such as one specifying {val_orig, val_alt, val_alt, val_orig} and another specifying {val_alt, val_orig, val_orig, val_alt}. The sequences would be applied at locations {offset_1, offset_2, offset_3, offset_4} to encode a watermark bit equal to 0 and 1 respectively. Applying such sequences of changes, the profiler generates multiple pre-watermarked versions of the encoded media content item. The profiler then invokes the encryptor to encrypt the alternate pre-watermarked versions to generate multiple encrypted pre-watermarked versions of the encoded media content item. The profiler further generates the corresponding watermark metadata based on the differences between the encrypted pre-watermarked versions. A salient effect of such a watermark metadata generation method is that some encryption standards permit avoiding having the whole alternate encrypted portion in metadata. For instance, with AES CTR encryption, the length of the difference remains the same whether in the encrypted domain or in the cleartext domain.

Referring to FIG. 4B, as represented by block 450, transmitting the encoded media content item and the corresponding watermark metadata to at least one edge node. In some embodiments, as represented by block 452, transmitting the encoded media content item and the corresponding watermark metadata to the at least one edge node includes multicasting the encoded media content item and the corresponding watermark metadata to a plurality of edge nodes. For example, popular content is likely to be transmitted via multicast to edge nodes to reduce the traffic in the core network and take advantage of the low latency of RAN on the edge. In the exemplary system 100A as shown in FIG. 1A, the cloud 110 multicasts or pushes the media content item and the watermark metadata to edge node a1 120a-1, edge node a2 120a-2, . . . , edge node aN 120a-N. The edge nodes a 120a can then cache such content along with the watermark metadata in their respective storage devices 123.

In some embodiments, as represented by block 454, the method 400 further includes receiving at least one request from the at least one edge node, where the at least one request includes a content identifier associated with the encoded media content item. In such embodiments, transmitting the encoded media content item and the corresponding watermark metadata to the at least one edge node includes unicasting the encoded media content item and the corresponding watermark metadata to the at least one edge node in response to receiving the at least one request. For example, in FIG. 1B, edge node 1b 120b-1 requests a particular media content item from the core network. In response, the core network sends the requested media content item and the corresponding watermark metadata via unicast to edge node 1b 120b-1. In other words, edge node 1b 120b-1 pulls the media content item and the watermark metadata from CDN 1 125-1 in the core network 101, and the watermark metadata is delivered using the same distribution mechanism as the media content item.

In some embodiments, as represented by block 456, transmitting the encoded media content item and the corresponding watermark metadata includes switching between transmitting via multicast and unicast the encoded media content item and the corresponding watermark metadata to the at least one edge node and at one neighboring edge node. For example, as explained above with reference to FIG. 3, when a network enables the MooD feature, the network determines how many client devices in any given area are consuming the same content and intelligently switches between multicast and unicast to ensure the network is as efficient as possible in that area. In such a network, when the delivery method changes between the core network and the edge node, the transmission to the client device is undisrupted and the edge node continuously applies JIT watermark embedding and packaging to protect the media content item.

Figure 5:
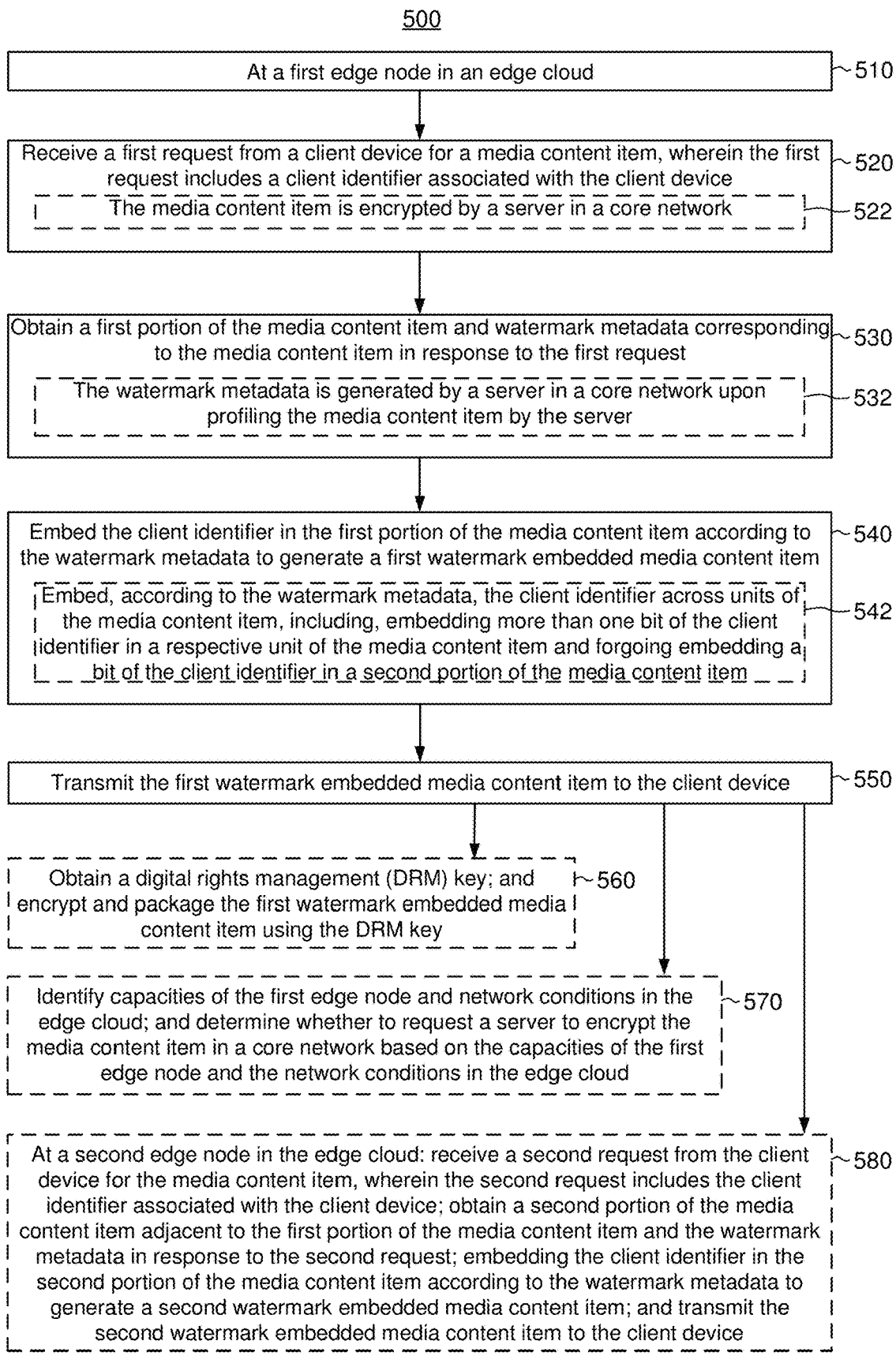
FIG. 5 is a flowchart illustrating a watermark embedding method in accordance with some embodiments.

FIG. 5 is a flowchart illustrating a watermark embedding method 500 in accordance with some embodiments. In some embodiments, as represented by block 510, the method 500 is performed at a first edge node in an edge cloud, e.g., the edge node a 120a in FIG. 1A, the edge node b 120b in FIG. 1B, the edge node 2a 210a in FIG. 2A, and/or the edge node 2b 210b in FIG. 2B. In some embodiments, the edge node is a device with one or more processors and a non-transitory memory.

The method 500 begins with the edge node receiving a first request from a client device for a media content item, where the first request includes a client identifier associated with the client device, as represented by block 520. In some embodiments, as represented by block 522, the media content item is encrypted by a server in a core network. For example, in FIG. 2B, the edge node 2b 210b receives a request from the client device 130 for a media content item, where the request includes a client identifier that is associated with the client device, such as a device ID, an IP address, a profile ID, and/or a user ID. Further as shown in FIG. 2B, in response to the request, the watermark embedder 122 in the edge node 2b 210b obtains the media content item and the corresponding watermark metadata from the storage device 205b by sending a request with a content URL to the storage device 205b. The storage device 205b then returns the encrypted DRM protected media content item and the watermark metadata to the watermark embedder 122. As described above with reference to FIGS. 1A and 1B, in some embodiments, the media content item has been encoded (e.g., by the encoder 112 in FIGS. 1A and 1B), profiled (e.g., by the profiler 116 in FIGS. 1A and 1B), and encrypted (e.g., by the encryptor 114 using DRM license(s)) to produce the watermark metadata.

As represented by block 530, the method 500 continues with the edge node obtaining a first portion of the media content item and watermark metadata corresponding to the media content item in response to the first request. In some embodiments, as requested by block 532, the watermark metadata is generated by a server in a core network (e.g., the cloud 110 in the core network 101, FIGS. 1A and 1B) upon profiling the media content item by the server. For example, as shown in FIGS. 2A and 2B, the watermark embedder 122 in the edge node obtains the media content item and the corresponding watermark metadata from the storage device by sending a request with a content URL to the storage device. Further, as described above with reference to FIGS. 1A and 1B, the profiler 116 on the cloud 110 in the core network 101 profiles the media content item and generates the corresponding watermark metadata.

The method 500 continues with the edge node embedding the client identifier in the first portion of the media content item according to the watermark metadata to generate a first watermark embedded media content item, as represented by block 540. As represented by block 542, in some embodiments, embedding the client identifier in the first portion of the media content item according to the watermark metadata includes embedding, according to the watermark metadata, bits of the client identifier across units of the media content item, including embedding more than one bit of the client identifier in a respective unit of the media content item and forgoing embedding a bit of the client identifier in a second portion of the media content item. As such, all the bits of the client identifier may not be embedded in a portion of the media content item. Further, while a respective unit (e.g., a segment) may have multiple bits of the client identifier embedded, some other portion(s) may not have any bit embedded. For example, when a respective portion is very small, e.g., the size or length of the portion is less than a threshold, no bit of the client identifier is embedded in the portion.

By embedding more than bits in each unit (e.g., a segment), the watermark embedding techniques described herein provide strong protection against collusion attacks. The goal for linear streaming watermarking is fast detection time and strong collusion avoidance capability. Typically, A/B watermarking uses 1-bit watermark per one or more ABR segments to encode a sequence of bits (e.g., 00110100) and use the sequence of bits for encoding a unique identifier. The main disadvantage of A/B watermarking is its sensitivity to collusion attacks. Some mitigation techniques against collusion use collusion avoidance codes (also known as anti-collusion codes). However, such codes can be long, and the length of the identifier increases as the number of the colluding sources increases, thus making the detection of live piracy impractical.

To allow for a long code, but still short detection time, one segment of the media content item would encode more than a single bit of the watermark identifier. In previously existing networks, units, such as content segments, are often embedded with watermarks on the backend. When each unit (e.g., each content segment) includes multiple watermark bits, there are more variants of the content to maintain on the origin or the caching network.

In contrast, by not sending the multiple variants or alternates to the edge, there is no cost for creating different versions of the content, e.g., each includes a sequence of multiple bits that encodes the full or parts of the watermark identifier. Further, collusion is dramatically reduced or avoided while the detection time is short, e.g., because the maximum number of bits of the watermark identifier are encoded in a short cycle of the content or stream. Short detection time in turn saves the cost of the watermark detection system and is more effective in counteractions against the detected leak sources. The solution described herein is particularly advantageous in 5G networks because the content is encoded (and profiled) once at the core, and the content and the watermark metadata are cached as a single copy until the very last layer, e.g., at the edge node. The edge can then optimize the insertion of the bits of the watermark sequence across units of the content according to the watermark metadata.

As represented by block 550, the method further includes transmitting the first watermark embedded media content item to the client device. For example, the first portion can include multiple units of the media content item, such as multiple blocks, pictures, frames, segments, GOPs, chunks, files, AUs, time units, etc., whether the media content item is encoded and encrypted as in FIG. 2B or encoded into an intermediate format as in FIG. 2A. Thus, the first watermark embedded media content item can be generated by embedding one or more bits of the client identifier as watermarks across multiple frames, segments, and/or files.

In some embodiments, as represented by block 560, the method 500 further includes obtaining one or more digital rights management (DRM) keys, and encrypting and packaging (e.g., JIT packaging) the first watermark embedded media content item (e.g., in an intermediate format as encoded by the encoder 112 in FIGS. 1A and 1B) using the one or more DRM keys. For example, as shown in FIG. 2A, the watermark embedder 122 embeds the device ID as the watermark on the media content item in an intermediate format. The encryptor 212 then performs encryption (e.g., with the DRM license(s)) and JIT packages the watermark embedded media content item.

In some embodiments, as represented by block 570, the method 500 further includes identifying capacities of the first edge node and network conditions in the edge cloud and determining whether to request a server to encrypt the media content item in a core network based on the capacities of the first edge node and the network conditions in the edge cloud. For example, in a 5G network, the MEC edge is aware of congestion and device capacities. Because when performing certain tasks (e.g., encryption), edge computing is expensive, the exemplary watermark embedding embodiment as shown in FIG. 2B is advantageous because it maximizes the common computing power (e.g., encoding, encryption, and profiling) in the cloud and minimizes the computational cost on edge and minimizes the latency in the network.

In some embodiments, as represented by block 580, the method 500 further includes, at a second edge node in the edge cloud, receiving a second request from the client device for the media content item, wherein the second request includes the client identifier associated with the client device, obtaining a second portion of the media content item and the watermark metadata in response to the second request, embedding the client identifier in the second portion of the media content item according to the watermark metadata to generate a second watermark embedded media content item, and transmitting the second watermark embedded media content item to the client device.

For example, as shown in FIG. 3, after the vehicle 330 receives the first portion of a watermark embedded video, e.g., N blocks, frames, pictures, segments, chunks, time units, and/or files of the video from edge node 1 320-1, the vehicle 330 seamlessly transitions to receiving the second portion of the watermark embedded video, e.g., starting from N+1 block, frame, picture, segment, chunk, time unit, and/or file of the video from edge node 2 320-2. Because both edge node 1 320-1 and edge node 2 320-2 embed watermarks according to the same watermark metadata, the watermarks are consistently embedded in both the first portion and the second portion of the video.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first device could be termed a second device, and, similarly, a second device could be termed a first device, which changing the meaning of the description, so long as all occurrences of the "first device" are renamed consistently and all occurrences of the "second device" are renamed consistently. The first device and the second device are both devices, but they are not the same device.

The terminology used herein is for the purpose of describing particular embodiments only and is not intended to be limiting of the claims. As used in the description of the embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting", that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The invention claimed is:

1. A method comprising:
at one or more servers including one or more processors and a non-transitory memory:
generating a profile for an encoded media content item to identify a first set of locations within the encoded media content item for changes, including scanning units of the encoded media content item to identify the first set of locations within the units and values to be applied at the first set of locations, and generating tuples, each including a respective location and respective values;
packaging the profile as corresponding watermark metadata for the encoded media content item, wherein the corresponding watermark metadata indicate watermark encoding based on the profile, including specifying a sequence of modifications at the identified first set of locations within the encoded media content item; and
transmitting the encoded media content item and the corresponding watermark metadata to at least one edge node for watermark embedding according to the watermark metadata.

2. The method of claim 1, wherein each of the units is at least one of a block, a frame, a picture, a segment, a group of pictures (GOP), a chunk, an access unit (AU), a file, or a time unit.

3. The method of claim 1, wherein packaging the profile as the corresponding watermark metadata includes grouping a set of the tuples to sequences of the values to apply at the locations.

4. The method of claim 1, wherein:
the encoded media content item includes an encrypted encoded media content item; and
packaging the profile as the corresponding watermark metadata for the encoded media content item includes packaging the profile into encryption compliant watermark metadata for the encrypted encoded media content item.

5. The method of claim 4, wherein the encrypted encoded media content item is generated by:
obtaining one or more digital rights management (DRM) keys; and
packaging the encoded media content item into the encrypted encoded media content item using the one or more DRM keys.

6. The method of claim 4, wherein packaging the profile into the encryption compliant watermark metadata for the encrypted encoded media content item includes:
applying at least a subset of changes specified in the profile to obtain alternate pre-watermarked versions of the encoded media content item;
encrypting the alternate pre-watermarked versions of the encoded media content item to generate encrypted pre-watermarked versions of the encoded media content item; and
generating the encryption complaint watermark metadata based on differences between the encrypted pre-watermarked versions of the encoded media content item.

7. The method of claim 1, wherein transmitting the encoded media content item and the corresponding watermark metadata to the at least one edge node includes multicasting the encoded media content item and the corresponding watermark metadata to a plurality of edge nodes.

8. The method of claim 1, further comprising:
receiving at least one request from the at least one edge node, wherein the at least one request includes a content identifier associated with the encoded media content item, and
wherein transmitting the encoded media content item and the corresponding watermark metadata to the at least one edge node includes unicasting the encoded media content item and the corresponding watermark metadata to the at least one edge node in response to receiving the at least one request.

9. The method of claim 1, wherein transmitting the encoded media content item and the corresponding watermark metadata includes switching between transmitting via multicast and unicast the encoded media content item and the corresponding watermark metadata to the at least one edge node and at least one neighboring edge node.

10. A method comprising:
at a first edge node including a hardware processor and a non-transitory memory in an edge cloud:
receiving a first request from a client device for a media content item, wherein the first request includes a client identifier associated with the client device;
obtaining from one or more servers in a core network a first portion of the media content item and watermark metadata corresponding to the media content item in response to the first request, wherein the watermark metadata indicate watermark encoding based on profiling of the media content item by the one or more servers and specify a sequence of modifications at a first set of locations within the encoded media content item identified by the one or more servers, wherein the watermark metadata is generated by the one or more servers upon scanning units of the media content item by the one or more servers to identify the first set of locations within the units and values to be applied at the first set of locations, and generating tuples by the one or more servers, each of the tuples includes a respective location and respective values;

embedding the client identifier in the first portion of the media content item at the first set of locations according to the watermark metadata to generate a first watermark embedded media content item; and transmitting the first watermark embedded media content item to the client device.

11. The method of claim 10, wherein the media content item is encrypted by the one or more servers in the core network.

12. The method of claim 10, wherein embedding the client identifier in the first portion of the media content item at the first set of locations according to the watermark metadata includes:

embedding, according to the watermark metadata, the client identifier across units of the media content item at the first set of locations, including, embedding more than one bit of the client identifier in a respective unit of the media content item and forgoing embedding a bit of the client identifier in a second portion of the media content item.

13. The method of claim 10, further comprising:

obtaining one or more digital rights management (DRM) keys; and encrypting and packaging the first watermark embedded media content item using the one or more DRM keys.

14. The method of claim 10, further comprising:

identifying capacities of the first edge node and network conditions in the edge cloud; and determining whether to request the one or more servers to encrypt the media content item in the core network based on the capacities of the first edge node and the network conditions in the edge cloud.

15. The method of claim 10, further comprising, at a second edge node in the edge cloud:

receiving a second request from the client device for the media content item, wherein the second request includes the client identifier associated with the client device;

obtaining a second portion of the media content item adjacent to the first portion of the media content item and the watermark metadata in response to the second request;

embedding at least one bit of the client identifier in the second portion of the media content item according to the watermark metadata to generate a second watermark embedded media content item; and transmitting the second watermark embedded media content item to the client device.

16. A system comprising:

one or more servers including one or more processors and a first non-transitory memory in a core network configured to:

generate a profile for an encoded media content item to identify a first set of locations within the encoded media content item for changes, including scanning units of the encoded media content item to identify the first set of locations within the units and values to be applied at the first set of locations, and generating tuples, each including a respective location and respective values;

package the profile as corresponding watermark metadata for the encoded media content item based on the profile, wherein the corresponding watermark metadata indicate watermark encoding based on the profile, including specifying a sequence of modifications at the identified first set of locations within the encoded media content item; and transmit the encoded media content item and the corresponding watermark metadata to at least one edge node in an edge cloud for watermark embedding according to the watermark metadata; and a first edge node including a hardware processor and a second non-transitory memory in the edge cloud, wherein the first edge node is configured to:

receive a first request from a client device for the encoded media content item, wherein the first request includes a client identifier associated with the client device;

obtain from the one or more servers a first portion of the encoded media content item and the corresponding watermark metadata in response to the first request;

embed the client identifier in the first portion of the encoded media content item at the first set of locations according to the corresponding watermark metadata to generate a first watermark embedded media content item; and transmit the first watermark embedded media content item to the client device.

17. The system of claim 16, wherein transmitting the encoded media content item and the corresponding watermark metadata to the at least one edge node includes multicasting the encoded media content item and the corresponding watermark metadata to a plurality of edge nodes in the edge cloud.

18. The system of claim 16, wherein the one or more servers are further configured to:

receive at least one request from the first edge node, wherein the at least one request includes a content identifier associated with the encoded media content item, and wherein transmitting the encoded media content item and the corresponding watermark metadata to the at least one edge node includes unicasting the encoded media content item and the corresponding watermark metadata to the first edge node in response to receiving the at least one request.

* * * * *